United States Patent
Link et al.

(10) Patent No.: US 12,233,958 B2
(45) Date of Patent: Feb. 25, 2025

(54) METHOD FOR OPERATING AN AIR GUIDING DEVICE OF A MOTOR VEHICLE, AND AIR GUIDING DEVICE FOR A MOTOR VEHICLE

(71) Applicant: Mercedes-Benz Group AG, Stuttgart (DE)

(72) Inventors: Alexander Link, Stuttgart (DE); Thorsten Ulferts, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 319 days.

(21) Appl. No.: 17/763,975

(22) PCT Filed: Aug. 6, 2020

(86) PCT No.: PCT/EP2020/072166
§ 371 (c)(1),
(2) Date: Mar. 25, 2022

(87) PCT Pub. No.: WO2021/058189
PCT Pub. Date: Apr. 1, 2021

(65) Prior Publication Data
US 2022/0388581 A1    Dec. 8, 2022

(30) Foreign Application Priority Data
Sep. 27, 2019  (DE) ................. 10 2019 006 751.7

(51) Int. Cl.
*B62D 35/00* (2006.01)
*B60Q 1/26* (2006.01)

(52) U.S. Cl.
CPC ......... *B62D 35/007* (2013.01); *B60Q 1/2661* (2013.01)

(58) Field of Classification Search
CPC .......... B60Q 5/005; B60Q 9/00; B62D 35/00; B62D 35/005; B62D 35/007; B62D 35/008; B62D 35/02; B62D 37/02
(Continued)

(56) References Cited

U.S. PATENT DOCUMENTS

| | | | |
|---|---|---|---|
| 8,798,868 B2 * | 8/2014 | Mares | B60T 8/1755 296/180.1 |
| 10,604,197 B2 | 3/2020 | Bray et al. | |
| 2008/0094194 A1 * | 4/2008 | Beneker | H02P 7/29 318/114 |

FOREIGN PATENT DOCUMENTS

| CN | 101200198 A | 6/2008 |
|---|---|---|
| CN | 102975779 A | 3/2013 |

(Continued)

OTHER PUBLICATIONS

English translation of DE 20 2009 002 106; retrieved via Patent-Translate located at www.epo.org. (Year: 2024).*
(Continued)

*Primary Examiner* — Jason S Daniels
(74) *Attorney, Agent, or Firm* — Crowell & Moring LLP

(57) ABSTRACT

A method for operating an air guiding device of a motor vehicle includes adjusting an air guiding element of the air guiding device from a starting position into an active position which influences aerodynamics of the motor vehicle. The method further includes exerting feedback pertaining to the adjusting of the air guiding element on a motor vehicle occupant in a form of a relative movement acting on the motor vehicle occupant, where the relative movement is generated by an adjustment of a chassis and/or a seat system of the motor vehicle from a first position to a second position.

7 Claims, 2 Drawing Sheets

(58) Field of Classification Search
USPC .......................................... 296/180.1–180.5
See application file for complete search history.

(56) References Cited

FOREIGN PATENT DOCUMENTS

| | | |
|---|---|---|
| CN | 106553711 A | 4/2017 |
| CN | 109426172 A | 3/2019 |
| DE | 10 2007 036 538 A1 | 4/2008 |
| DE | 20 2009 002 106 U1 | 6/2009 |
| DE | 10 2008 043 470 A1 | 5/2010 |
| DE | 10 2015 208 211 A1 | 11/2016 |
| DE | 10 2018 123 481 A1 | 3/2019 |
| DE | 10 2018 006 787 A1 | 3/2020 |
| DE | 10 2020 003 626 A1 | 7/2020 |
| WO | WO 2004/022409 A2 | 3/2004 |

OTHER PUBLICATIONS

PCT/EP2020/072166, International Search Report dated Nov. 2, 2020 (Two (2) pages).

German-language German Office Action issued in German application No. 10 2019 006 751.7 dated Apr. 30, 2020 (Four (4) pages).

Chinese-language Chinese Office Action issued in Chinese Application No. 202080064338.7 dated Mar. 30, 2024 (8 pages).

\* cited by examiner

METHOD FOR OPERATING AN AIR GUIDING DEVICE OF A MOTOR VEHICLE, AND AIR GUIDING DEVICE FOR A MOTOR VEHICLE

BACKGROUND AND SUMMARY OF THE INVENTION

The invention relates to a method for operating an air guiding device of a motor vehicle. The invention further relates to an air guiding device for a motor vehicle.

In aerodynamic vehicle development, in addition to air resistance and cooling requirements, the lift on the front and rear axles is a crucial design criterion. This particularly applies to powerful vehicles in which the lift on the front and/or rear axle is often balanced using air guiding devices which, for example at higher driving speeds, are shifted from a starting position into an active position in order to influence the aerodynamics of the motor vehicle.

Since, to a great extent, as described above, such extendible air guiding devices crucially influence the aerodynamics and, in particular, the lift or downforce on the front and rear axles, it is of considerable relevance to the respective occupants of the motor vehicle, primarily of course the driver, whether the respective air guiding element is in the retracted starting position or in the extended active position. However, it has been shown that the respective motor vehicle occupants, in particular the driver of the motor vehicle, often only perceive the aerodynamic components to a very limited extent even though they have the considerable influence on the driving behavior of the motor vehicle already explained. Not least for reasons of an economic driving style and for saving operating power, it is therefore desirable to provide the occupants, in particular the driver, with corresponding feedback or information on whether the corresponding air guiding element of the air guiding device is in its active position which influences the aerodynamics of the motor vehicle.

Already known from DE 20 2009 002 106 U1 is a display device by means of which the driver is provided with feedback pertaining to whether the respective air guiding element is in its active position.

The generic DE 10 2018 006 787 A1 discloses a motor vehicle having an electromotively operable driving device for the adjustment of movable vehicle body parts, in particular spoilers, which is configured and operable such that, by means thereof, an operating noise corresponding to a predefinable requirement profile can be generated. If the vehicle driver activates the spoiler while in urban traffic or while stationary by pressing a button to extend it, they receive feedback pertaining to the adjustment process in the form of an operating noise generated by means of the electric motor which can be perceived through audible and/or feelable vibrations. The spoiler is automatically extended and retracted when in driving mode independently of the speed, the operating noises of the electric motor not being modelled in this operating state since they are inaudible in any case owing to the operating noises of the motor vehicle.

The problem underlying the present invention is to provide a method and an air guiding device of the kind described in the introduction by means of which the adjustment of the respective air guiding element of the air guiding device can be fed back to or brought to the attention of the respective occupant, in particular the driver, in a particularly reliable way and without causing any distraction.

In order to provide a method of the kind described in the introduction in which at least one air guiding element of the air guiding device is adjusted from a starting position into an active position which influences the aerodynamics of the motor vehicle and feedback pertaining to the adjustment of the air guiding element for at least one motor vehicle occupant, in particular the driver, is generated by means of a feedback device, provision is made for the feedback pertaining to the adjustment of the air guiding element generated by means of the feedback device to be exerted in the form of a relative movement acting on the at least one motor vehicle occupant. Consequently, feedback pertaining to the adjustment of the air guiding element into the active position acting on the vestibular perception and/or on the mechanoreceptors and/or on the auditory perception of the respective motor vehicle occupants, in particular the driver, is generated by means of the feedback device, the feedback being correspondingly perceived by the respective motor vehicle occupant/driver owing to their sensory perception. The essence of the invention is consequently to provide the respective motor vehicle occupant, in particular the driver, with corresponding feedback or information or a corresponding signal without causing any distraction, in particular any visual distraction, the feedback feeding back to them or enabling them to sense that the positioning of the air guiding element into the active position has been carried out or completed. Consequently, according to the invention, by means of the feedback device, feedback is supposed to be generated which appeals to the corresponding sensory perceptions of the human body listed above by a relative movement of the human body with respect to the motor vehicle or a similar influence being generated. Unlike in the previous prior art, this is supposed to take place without any distraction, in particular any visual distraction, of the motor vehicle occupants or, in particular, the driver so that the latter can intuitively sense or feel, while the vehicle is being driven, whether an adjustment of the respective air guiding element of the air guiding device is just being carried out or has been carried out.

Provision is made according to the invention for the relative movement acting on the at least one motor vehicle occupant to be exerted through an adjustment of a chassis and/or of a seat system of the motor vehicle. If the at least one air guiding element of the air guiding device is consequently shifted into the active position, then preferably, an, in particular dynamic, preferably sudden relative movement acting on the respective motor vehicle occupant, in particular on the driver, is concomitantly carried out, the relative movement making the adjustment of the air guiding device noticeable and perceptible for the respective motor vehicle occupant. As already explained, the vestibular perceptions and/or the mechanoreceptors and/or the auditory perception of the respective motor vehicle occupant is supposed to be appealed to thereby so that the latter is made aware of the adjustment of the air guiding device without distraction. The feedback provided hereby can be provided here merely during the adjustment or also after the adjustment and permanently.

Provision is therefore made here, for example, for the chassis of the motor vehicle to be lowered or otherwise influenced depending on the adjustment of the respective air guiding element so that the respective motor vehicle occupant experiences a relative movement depending on the adjustment of the air guiding element. This relative movement is consequently not to be attributable to other physical influences caused by driving, but is instead specifically induced, for example, by means of the chassis as a function of the adjustment of the air guiding element. Consequently, in the present case, the chassis or an associated control device functions as the feedback device by means of which the relative movement of the respective motor vehicle occupant provided for according to the invention is generated. As an alternative to the chassis, an adjustment, in particular of an electrically adjustable seat system of the motor vehicle, can of course also correspondingly be carried out as a function of the adjustment of the respective air guiding element of the air guiding device in order thereby to exert the feedback desired according to the invention on the respective motor vehicle occupant.

Air guiding devices are to be understood in this context to mean both wings which have air flowing both over and under them, and spoilers which have air flowing only over or under them. These air guiding elements are part of a variable aerodynamic system here and can be configured both as separate attachments and as possibly integrated component areas of the outer skin of the motor vehicle.

In a further configuration of the invention it has been shown to be advantageous, after the relative movement acting on the at least one motor vehicle occupant, for the at least one motor vehicle occupant to be shifted back by means of the feedback device. Consequently, it may, for example, be that a chassis is shifted back into the original position when the drive position of the respective air guiding element is closed and/or when the air guiding element is back in its starting position. Similarly, a correspondingly adjustable vehicle seat can also be shifted back into its original position after completion of the adjustment of the respective air guiding element.

It has also been shown to be advantageous for the relative movement acting on the at least one motor vehicle occupant by means of the feedback device to be exerted during and/or after the adjustment of the air guiding element into the active position. The corresponding adjustment of the air guiding element into the active position and, if applicable, also the fact that the respective air guiding element is still in the active position can therefore optionally be fed back to the occupant. It would also be theoretically conceivable for the adjusting of the respective air guiding element back into the starting position to be fed back accordingly.

Finally, it has been shown to be advantageous for visual or auditory feedback to be generated by means of a feedback element of the feedback device directly on the air guiding element. It is conceivable, for example, in an area of the air guiding element having air correspondingly flowing around it, for provision to be made of a corresponding baffle, resonating body or the like which, for example, generates auditory feedback if, when the motor vehicle is in driving mode, the corresponding air guiding element is moved into the active position. Corresponding lights or forms of visual feedback can also be generated directly in the area of the respective air guiding element in order to inform the corresponding motor vehicle occupant of the adjustment of the respective air guiding element.

In one advantageous embodiment of the method, provision is made for feedback pertaining to the adjustment of the air guiding element into its active position acting on the auditory perception of the at least one motor vehicle occupant to be exerted by means of the feedback device. Such an auditory signal or auditory feedback also has the advantage that the respective motor vehicle occupants, in particular the driver of the motor vehicle, are/is distracted far less than would be the case, for example, if they were notified visually.

The invention also includes an air guiding device for a motor vehicle. The advantages thereof are apparent from the advantages already described in the same manner.

Further advantages and details of the invention are set out in the following description of preferred exemplary embodiments and by reference to the drawings. The features and feature combinations specified in the description above and the features and feature combinations shown in the description of the figures and/or in the figures alone below can be used not only in the combination specified in each case, but also in other combinations or on their own without falling outside the scope of the invention.

DETAILED DESCRIPTION OF THE DRAWINGS

Figure 1:
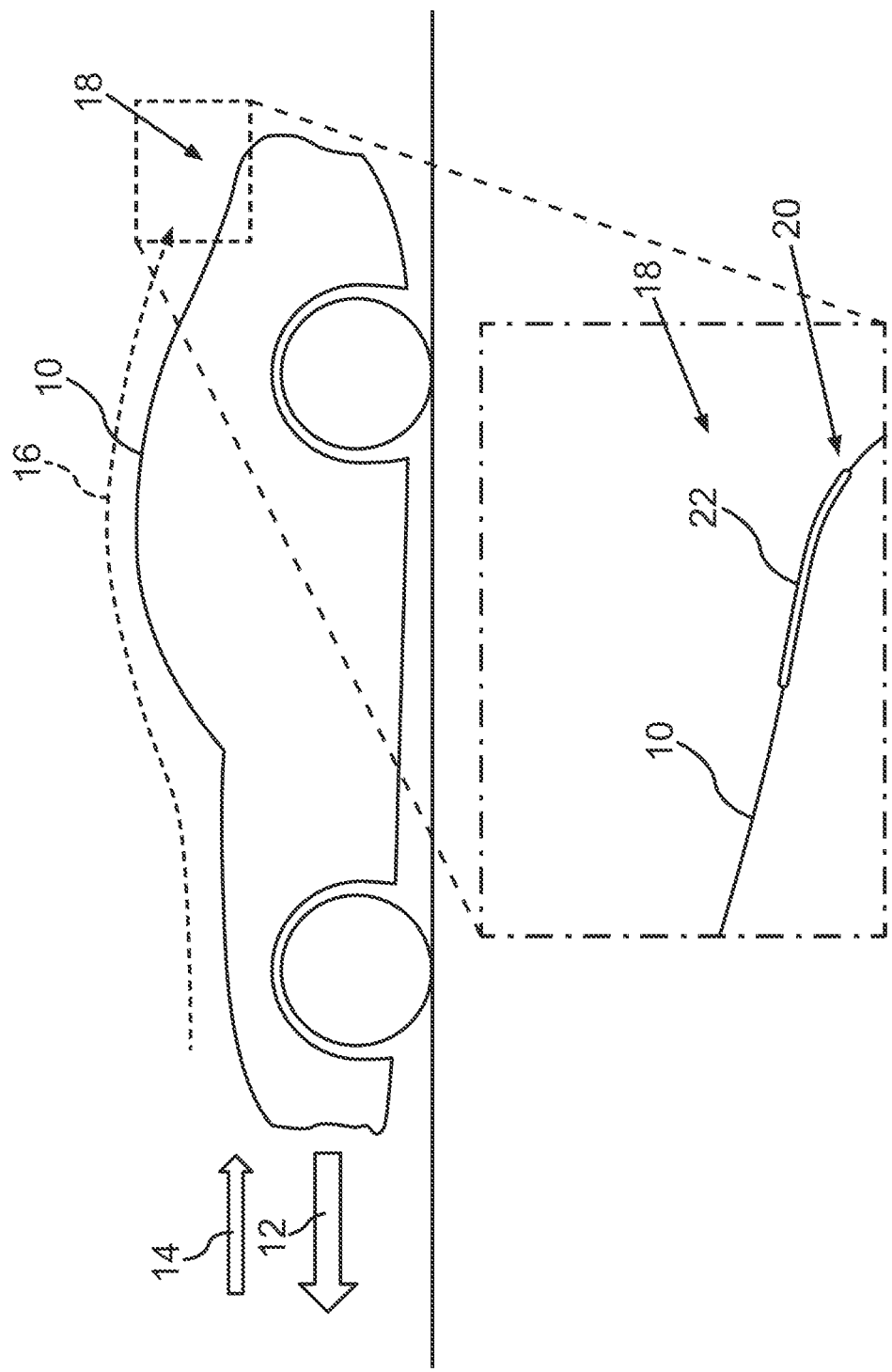
FIG. 1 shows a schematic side view of a passenger motor vehicle having an air guiding element of an air guiding device provided in the rear section which, in the present case, is arranged in a starting position at least substantially integrated into the outer skin of the motor vehicle according to the enlarged detailed view of part thereof.
Figure 2:
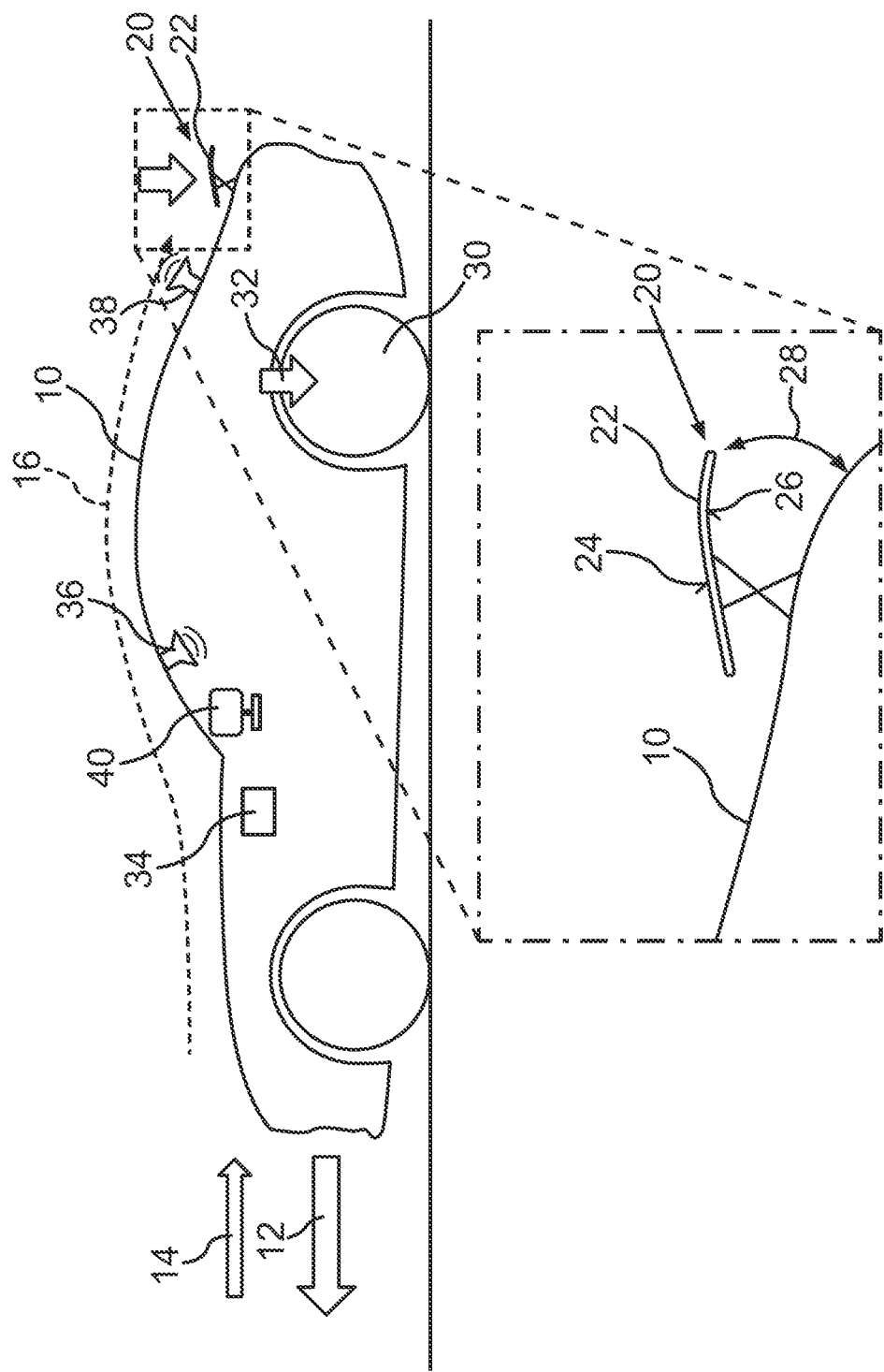
FIG. 2 shows a side view of the motor vehicle according to FIG. 1 and of the air guiding element of the air guiding device of which part is shown in the enlarged detailed view, the air guiding element having been adjusted from the starting position shown in FIG. 1 into an active position which influences the aerodynamics of the motor vehicle, wherein a chassis of the motor vehicle also functions as a feedback device by means of which feedback in the form of a relative movement acting on the at least one motor vehicle occupant has been exerted by lowering the motor vehicle at the rear axle as feedback pertaining to the adjustment of the air guiding element.

FIGS. 1 and 2 each show a schematic side view of a passenger motor vehicle. To be precise, an outer skin 10 of the passenger motor vehicle forming the outer contour is essentially shown which, when the motor vehicle is being driven in a direction of travel according to an arrow 12, has air flowing towards it as shown by an arrow 14 or over the top of it according to an arrow 16.

A part of the rear section 18 of the passenger motor vehicles is shown in each case in enlarged form according to FIGS. 1 and 2. In this rear section 18, provision is made for an air guiding device 20 having at least one air guiding element 22 which, in FIG. 1, is arranged in an at least substantially inactive starting position in which the latter is integrated at least substantially into the outer skin 10 of the motor vehicle in the rear section 18.

As can be seen by comparison with FIG. 2, in the present exemplary embodiment, the air guiding element 22 is designed as a rear wing which can be shifted out of the starting position shown in FIG. 1 into the active position shown in FIG. 2 in which both its top side 24 and its bottom side 26 have air flowing towards or around them (arrow 16). The adjustment of the air guiding element 22 or rear wing is indicated symbolically here by the arrow 28. Since the rear wing 22 can also be shifted back into its starting position again, the arrow 28 is correspondingly configured as a double arrow.

An adjustment of the air guiding element or rear wing 22 of the air guiding device 20 usually takes place at high driving speeds, for example above 80 or 120 kilometers an hour, in order, for example, to generate downforce on a rear axle 30 or generally influence the aerodynamics of the motor vehicle. In such active components for influencing the aerodynamics of motor vehicles, however, it has been shown that the perception of the motor vehicle occupants, in particular the driver, of the time from which these active components or air guiding elements 22 of respective air guiding devices 20 are extended and therefore active is extremely variable or only occurs in the rarest of cases. On the other hand, for example, it is of considerable importance for the driving behavior of the driver and also of the vehicle whether or not the respective air guiding element 22 is already in the active position. According to the previous prior art, the driver has, for example, so far only been able to get an idea thereof if they are looking at a corresponding display on the instrument cluster of their passenger motor vehicle or if they are controlling the speed currently being driven. Both mean additional distraction.

For this reason, feedback pertaining to the adjustment of the air guiding element 22 is exerted on the at least one motor vehicle occupant, in particular the driver, here, that is to say in the form of a relative movement acting thereon or another kind of feedback acting on their vestibular perception and/or on their mechanoreceptors and/or on their auditory perception. This means that, by means of a feedback device explained in even more detail below, the physical awareness or sensory perception of the respective vehicle occupant is appealed to in order to make them aware of the adjustment of the air guiding element 22 of the air guiding device 20.

In the specific exemplary embodiment, this takes place—as indicated by an arrow 32—by a chassis of the motor vehicle carrying out a corresponding relative movement which is conditional upon the adjustment of the air guiding element 22. If, in the present case, the air guiding element 22 of the air guiding device 20 is consequently extended and the aerodynamics of the motor vehicle are consequently influenced, then, for example, the active chassis of the vehicle is moved suddenly or similarly dynamically downwards according to the arrow 32. As a result, for example, the rear downforce of the rear wing 22 can be made perceptible by the rear section of the vehicle being briefly pressed down to a greater extent or being simulated by the chassis. The chassis is then shifted back into its original position again after a certain time, for example.

In the present case, the chassis of the motor vehicle therefore functions as a feedback device by means of which the motor vehicle is lowered according to the arrow 32 when the air guiding element 22 is extended and therefore the corresponding relative movement is exerted on the motor vehicle occupants, in particular the driver. Conversely, after a certain time, the original position of the chassis is restored again, that is to say the at least one motor vehicle occupant is shifted backwards by means of the feedback device (chassis).

In order to bring about a corresponding relative movement of the motor vehicle occupant or driver by means of the chassis when the air guiding element 22 is adjusted, a control device 34 of the feedback device or of the chassis is integrated into the motor vehicle here, this being designed to generate the feedback pertaining to the adjustment of the air guiding element 22 in the form of a relative movement acting on the at least one motor vehicle occupant. For this purpose, the control device is accordingly connected to the air guiding element 22 and the feedback device, in the present case the chassis.

As an alternative to the chassis, it would also be conceivable to make an intervention in an electrical adjustment of a vehicle seat or the like in the seat system or, for example, also an intervention in the braking system of the motor vehicle. It may also be possible hereby, for example, to generate dynamic, in particular sudden, relative movements of the respective motor vehicle occupant, in particular the driver, in order to provide them with information on the adjustment of the respective air guiding element 22.

The corresponding feedback can be provided here during the adjustment of the air guiding element 22 and/or during the entire operation of the air guiding element 22 in its active position. As in the present case, it is also conceivable for the relative movement of the motor vehicle occupant to be stopped after a certain time in which the air guiding element 22 is in its active position.

FIG. 2 also shows respective speakers 36, 38 in the interior of the motor vehicle or outside and near the air guiding element 22. Instead of or in addition to the feedback generated pertaining to the relative movement, it is therefore also conceivable, in the case of an adjustment of the air guiding element 22, to exert feedback pertaining to the adjustment of the air guiding element 22 into the active position acting on the auditory perception of the respective motor vehicle occupant or driver. Similarly to a relative movement which is exerted on the motor vehicle occupant, such auditory feedback has the advantage that it causes relatively little distraction. Instead of the speaker 38 shown here on the outer skin 10 of the motor vehicle, it would also be conceivable to arrange a different kind of feedback element of the feedback device directly on or near the air guiding element 22 of the air guiding device 20. By means of this feedback element which, for example, could be an acoustic baffle or the like, it is therefore easily possible for an auditory signal or auditory feedback pertaining to the adjustment of the air guiding element 22 to be generated. However, in the present case, the speakers 36, 38 are the respective feedback elements of the feedback device.

In addition, it may also be possible to generate visual feedback pertaining to the adjustment of the air guiding element 22 which, for example, is generated through a corresponding feedback element directly on or near the air guiding element 22. For example, a corresponding light or the like of the respective air guiding element 22 would also be conceivable. A display element 40 in the cockpit of the vehicle on which the position of the air guiding element 22 can also be displayed is also apparent in the present case.

In summary, the method according to the invention is particularly suitable and also intended for use while the motor vehicle is being driven in order to inform the at least one vehicle occupant or to exert influence thereon as soon as the air guiding element of the air guiding device is adjusted from a starting position into an active position which influences the aerodynamics of the motor vehicle. This is also particularly advantageous and functionally safe when the motor vehicle is travelling at high speeds, that is to say not only when it is stationary or in urban traffic, so the method can be carried out at any speed of the motor vehicle.

The invention claimed is:
1. A method for operating an air guiding device of a motor vehicle, comprising the steps of:
adjusting an air guiding element of the air guiding device from a starting position into an active position which influences aerodynamics of the motor vehicle; and
exerting feedback pertaining to the adjusting of the air guiding element on a motor vehicle occupant in a form of a relative movement acting on the motor vehicle occupant, wherein the relative movement is generated by an adjustment of a chassis and/or a seat system of the motor vehicle from a first position to a second position.

2. The method according to claim 1, further comprising the step of, after the exerting, shifting the chassis and/or the seat system to the first position.

3. The method according to claim 1, wherein the exerting occurs during and/or after the adjusting.

4. The method according to claim 1, further comprising the step of generating visual or auditory feedback by a feedback element disposed on the air guiding element.

5. The method according to claim 1, further comprising the step of exerting feedback pertaining to the adjusting which acts on an auditory perception of the motor vehicle occupant.

6. An air guiding device of a motor vehicle, comprising:
an air guiding element which is adjustable from a starting position into an active position, wherein aerodynamics of the motor vehicle are influenceable by the active position; and
a feedback device, wherein feedback pertaining to an adjustment of the air guiding element from the starting position into the active position is exertable by the feedback device on a motor vehicle occupant;
wherein a chassis of the motor vehicle and/or a seat system of the motor vehicle are/is configured as the feedback device and wherein via the feedback device the feedback pertaining to the adjustment of the air guiding element is generatable in a form of a relative movement acting on the motor vehicle occupant.

7. The air guiding device according to claim 6, wherein a feedback element is disposed on the air guiding element and wherein via the feedback element visual or auditory feedback pertaining to the adjustment of the air guiding element is generatable.

* * * * *